United States Patent

[11] 3,609,488

[72] Inventors John B. Sampson
Cupertino;
Hadyn L. Smith, China Lake, both of Calif.
[21] Appl. No. 17,676
[22] Filed Mar. 9, 1970
[45] Patented Sept. 28, 1971
[73] Assignee The United States of America as represented by the Secretary of the Navy

[54] SPEED CONTROL FOR A SYNCHRONOUS MOTOR
5 Claims, 3 Drawing Figs.
[52] U.S. Cl. .................................................. 318/171,
318/231, 318/314, 318/318, 318/341
[51] Int. Cl. ........................................................ H02p 7/42
[50] Field of Search ............................................ 318/171,
231, 314, 318, 341

[56] References Cited
UNITED STATES PATENTS
| | | | |
|---|---|---|---|
| 3,097,267 | 7/1963 | Clark et al. .................. | 318/314 X |
| 3,175,034 | 3/1965 | Kihara .......................... | 318/314 X |
| 3,176,208 | 3/1965 | Gifft .............................. | 318/314 |
| 3,423,523 | 1/1969 | Kosugi et al. ................. | 318/314 X |
| 3,514,679 | 5/1970 | Larson ......................... | 318/314 |

*Primary Examiner*—Gene Z. Rubinson
*Attorneys*—R. S. Sciascia and Roy Miller

ABSTRACT: A motor control means to accomplish frequency changing which in turn achieves a speed change in a synchronous motor comprising a voltage controlled oscillator which responds to a discriminator circuit which either increases or decreases the frequency output of the oscillator in accordance with whether a synchronizing pulse is early or late with respect to an enabling pulse.

PATENTED SEP 28 1971 3,609,488

JOHN B. SAMPSON
HADYN L. SMITH
INVENTORS

BY Roy Miller
Attorney

SPEED CONTROL FOR A SYNCHRONOUS MOTOR

GOVERNMENT INTEREST

The invention described herein may be manufactured and used by or for the Government of the United States of America for governmental purposes without the payment of any royalties thereon or therefor.

CROSS REFERENCE TO RELATED APPLICATION

The present invention is a motor control apparatus adapted for use in copending U.S. application Ser. No. 826,540, filed 21 May 1969 by McLean et al.

BACKGROUND OF THE INVENTION

The invention synchronizes a hysteresis synchronous, or any other type synchronous, motor speed to an input frequency which may vary with time. With references to FIG. 1, input pulses X ideally occur every $\alpha$ seconds. However, due to instability of the system creating the input pulses, they actually occur every $\alpha \pm \Delta\alpha$ seconds. The object of the present invention is to line up the point X on the rotating drum with reference point X every time a pulse occurs at the input to the system. This is done by varying the rotational speed of a synchronous hysteresis motor. In the copending application, a chart is generated which requires a reference mark corresponding to a sound generator with respect to an ocean floor. Therefore, it is necessary that the mark X be inserted on the film carried by the drum at a very precise time.

DESCRIPTION OF THE INVENTION

Figure 2:
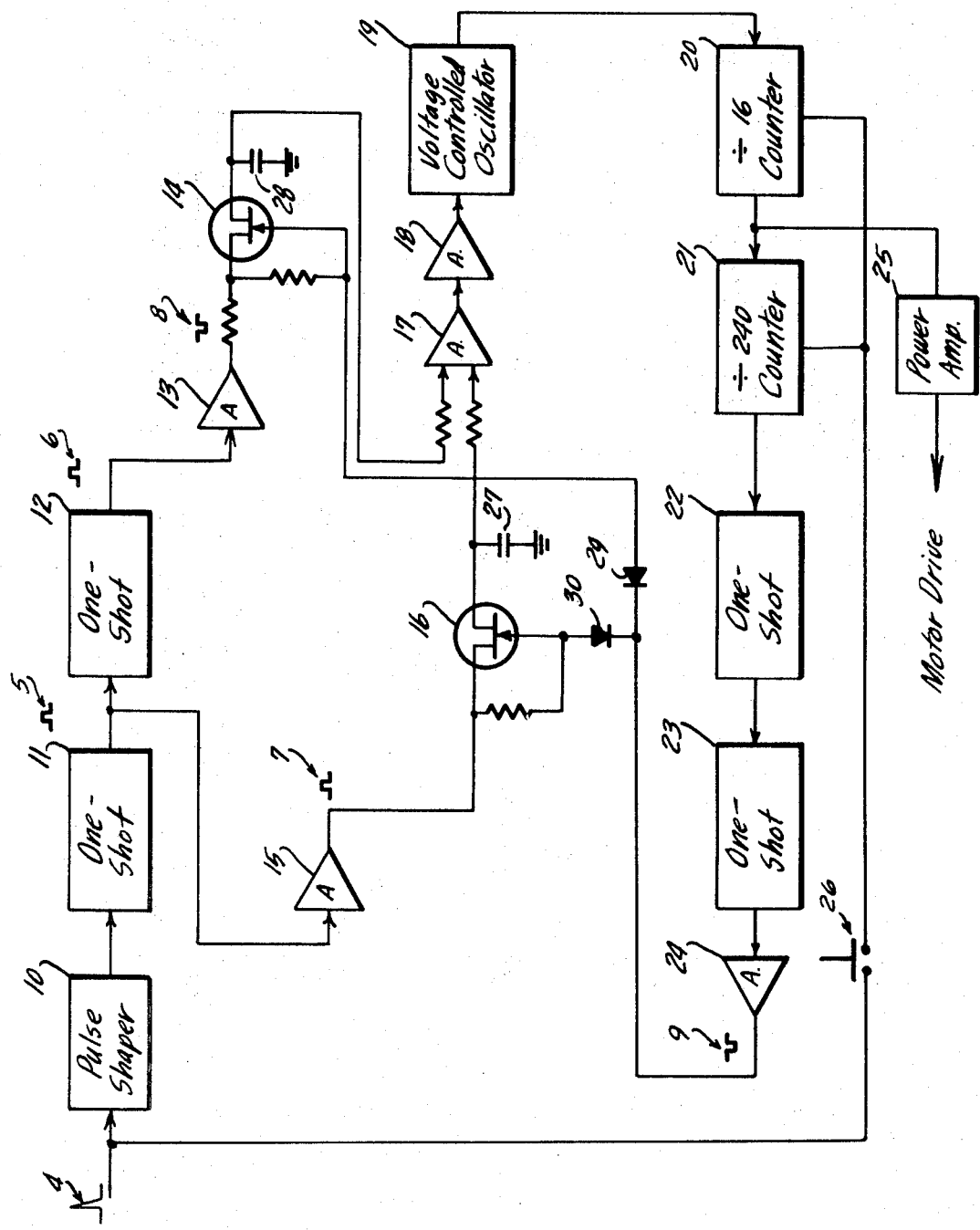
FIG. 2 is a block diagram of the overall system.

In FIG. 2, pulse 4 is inputted from the sound generator of copending U.S. application Ser. No. 826,540 to pulse shaper and inverter 10 where it is first inverted. The output pulse from the pulse shaper 10 triggers one-shot multivibrator 11 the output of which in turn triggers one-shot multivibrator 12. One-shots 11 and 12 have a period of 400 milliseconds each. The output of multivibrator 11 is also connected to a buffer amplifier 15.

The output of the multivibrator 12 is coupled to the input of a unity gain inverting amplifier 13 the output of which is coupled to a field effect transistor (FET) 14. The output of the FET 14 is coupled to one side of a capacitor 28 the other side of which is connected to ground. The output of FET 14 is also connected to one input of a unity gain summing amplifier 17.

The output of unity gain amplifier 15 is connected as the input to FET 16 the output of which is coupled to one side of a capacitor 27 the other side of which is connected to ground. The output of FET 16 is also connected as a second input to unity gain summing amplifier 17.

The output of the amplifier 17 is connected to the input of another amplifier 18 having a gain adjust control (not shown). The output of the amplifier 18 is in turn connected to the input of a voltage controlled oscillator 19 which outputs a constant 960 cycles per second with no input thereto.

The output of the VCO 19 is divided by 16 in counter 20 and again by 240 (when $\alpha=4$ seconds) in counter 21 and coupled to the input of a one-shot multivibrator 22 having a period of 200 milliseconds. The output of the one-shot 22 is coupled to the input of another one-shot 23 having a 400 millisecond period.

The output of the one-shot 23 is coupled through a buffer amplifier 24 and connected through isolating diodes 29 and 30 as the enabling pulse for FET's 14 and 16, respectively.

Figure 1:
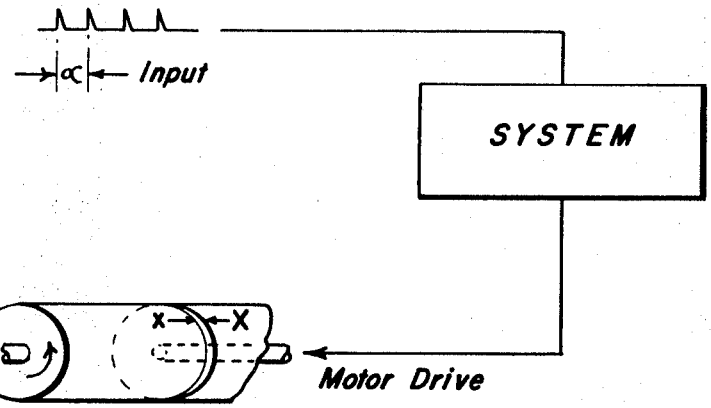
FIG. 1 is a schematic diagram illustrating the problem to be solved.

The output from counter 20 is also coupled to the input of a power amplifier 25 the output of which is used to drive the hysteresis motor used to turn the rotating drum of FIG. 1.

In operation, the output of the voltage-controlled oscillator 19 is divided by 16 at counter 20 which produces an output of 60 cycles per second. For $\alpha=4$ seconds, this 60-cycle output is again divided by 240 in counter 21 yielding pulses every 4 seconds. One-shot 22, is thusly triggered every 4 seconds. The output of the one-shot 22 in turn triggers one-shot 23 every 4 seconds plus 200 milliseconds (the duration of one-shot 22).

Figure 3:
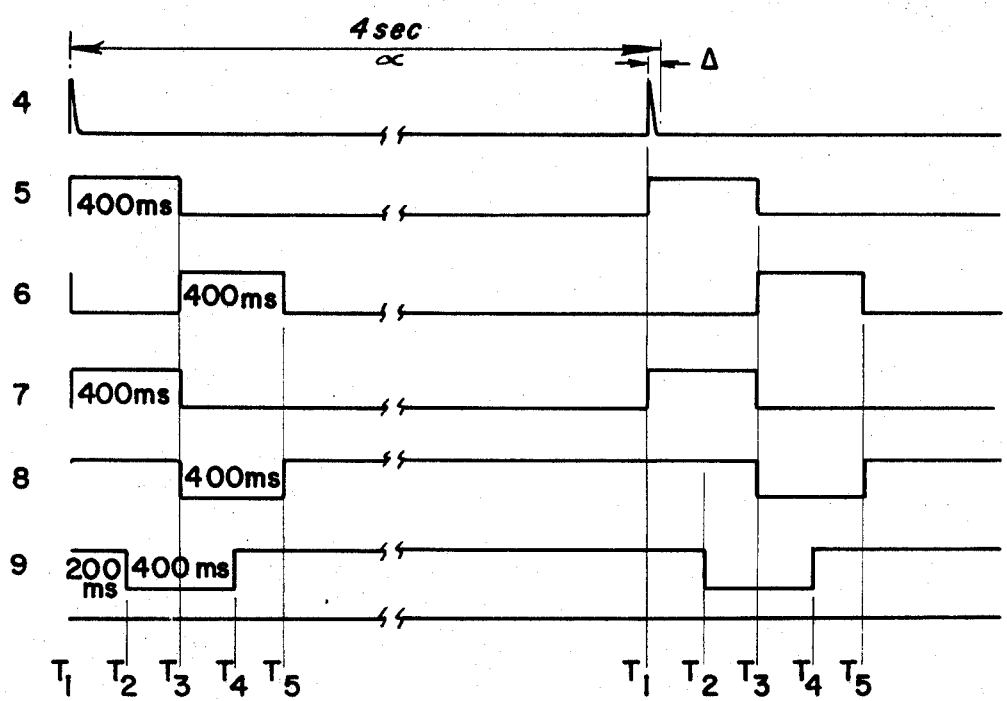
FIG. 3 illustrates waveforms at various points in the block diagram of FIG. 2.

Now with respect to FIG. 3, at time $T_1$ the input pulse 4 from the sounder of the copending application occurs. One-shot 23 outputs a positive pulse at $T_2$ as controlled by the output of the voltage controlled oscillator 19. Amplifier 24 converts this to a negative going pulse which enables field effect transistors 14 and 16, respectively. The field effect transistors are enabled from $T_2$ to $T_4$. Field effect transistor 14 will produce an output from time $T_3$ to $T_4$ in that one-shot 12 produces an output pulse from time $T_3$ to $T_5$ and the field effect transistor 14 is in turn enabled from $T_2$ to $T_4$. Similarly, the output of field effect transistor 16 occurs during the time period $T_2$ to $T_3$ in view of the output of one-shot 11 occurring from time $T_1$ to $T_3$ and the enabling time of $T_2$ to $T_4$.

Capacitors 27 and 28 in the output circuits of transistors 16 and 14, respectively, are charged during times $T_2$ to $T_3$ and $T_3$ and $T_3$ to $T_4$, respectively, thereby yielding an integration effect.

Amplifier 17 sums the voltages across capacitors 27 and 28 thereby yielding a DC voltage whose polarity is plus or minus depending on gate pulse 9.

Voltage-controlled oscillator 19 changes frequency in response to the signal from amplifier 18. A plus error signal from the amplifier 18 lowers the frequency of the voltage-controlled oscillator 19 while a minus error signal increases frequency.

FIG. 3 illustrates the situation $\alpha - \Delta\alpha$.

At the beginning of each new chart the system has to be locked on to the input pulse 4. This is accomplished by the use of the sync switch 26. Closing sync switch 26 allows input pulse 4 to reset the counters 20 and 21 each time it occurs. As long as the sync switch 26 is closed, gate pulse 9 is slaved to the input pulse 4 and FET's 14 and 16 are switched in synchronism with pulse 4. This allows integrating capacitors 27 and 28 to develop the proper initial charges so that when the sync switch 26 is opened the system will stay locked on input pulse 4 and track it.

The operation of this system has been described for an input pulse period ($\alpha$) of 4 seconds. If ($\alpha$) were changed to some other value, counter 21 would have to be changed correspondingly. For example, for ($\alpha$) of 2 seconds counter 21 would have to divide by 120.

The frequency of the signal outputted by voltage control oscillator 19 is therefore $960 \pm \Delta\alpha$ which yields an output from counter 20 of $60 \pm \Delta\alpha$ CPS. The power amplifier 25 thusly outputs a frequency to the hysteresis motor which varies slightly from 60 cycles per second to correct for the error in time spacing between the input pulses.

What is claimed is:
1. Speed control means responsive to low frequency pulses for a motor comprising;
   pulse-producing means which produce output pulses of a certain frequency in accordance with and in response to an input voltage;
   input means adapted to receive regularly occurring input pulses; said input pulses having a period $\alpha \pm \Delta\alpha$;
   first gating means for producing an output pulse of a predetermined length;
   second gating means for producing an output pulse of the same length as said first gating means;
   said first and second gating means being operatively connected to said input means for receiving said input pulses;
   gate control means operatively connected to the output of said pulse-producing means for producing an enabling pulse which is coupled to said first and second gating means;
   summing means operatively connected to said first and second gating means for receiving and summing the out- puts from said first and second gating means and producing an output voltage corresponding to $\pm\Delta\alpha$;

the output of said summing means being connected to said pulse-producing means to cause the output frequency of said pulse-producing means to vary in accordance with $\Delta\alpha$.

2. Speed control means as set forth in claim 1 and further including;

integrator means operatively connected in the output circuit of said first and second gating means for producing an output voltage corresponding to the time interval during which an enabling pulse and input pulse are present at the inputs to said first and second gating means.

3. Speed control means as set forth in claim 1 and further including;

pulse inverter means operatively connected between said input means and said one of said first and second gating means for inverting the input pulse thereto.

4. Speed control means as set forth in claim 3 and further including;

synchronous motor means operatively connected to the output of said pulse-producing means and being driven thereby.

5. Speed control means as set forth in claim 1 wherein; said pulse-producing means is a voltage-controlled oscillator.